United States Patent
Song (10) Patent No.: US 9,800,577 B2
(45) Date of Patent: Oct. 24, 2017

(54) METHOD AND APPARATUS FOR CONTROLLING COMMUNICATIONS TERMINAL AND CORRESPONDING COMMUNICATIONS TERMINAL

(71) Applicant: Tencent Technology (Shenzhen) Company Limited, Shenzhen, Guangdong (CN)

(72) Inventor: Jiashun Song, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 14/983,254

(22) Filed: Dec. 29, 2015

(65) Prior Publication Data

US 2016/0134625 A1 May 12, 2016

Related U.S. Application Data

(63) Continuation of application No. PCT/CN2015/074867, filed on Mar. 23, 2015.

(30) Foreign Application Priority Data

Mar. 24, 2014 (CN) .......................... 2014 1 0110038

(51) Int. Cl.
*H04L 29/06* (2006.01)
*H04W 12/12* (2009.01)
(Continued)

(52) U.S. Cl.
CPC .... *H04L 63/0853* (2013.01); *H04M 1/72577* (2013.01); *H04W 8/22* (2013.01); *H04W 12/06* (2013.01); *H04W 12/12* (2013.01)

(58) Field of Classification Search
CPC .... H04L 63/0853; H04W 12/06; H04W 8/22; H04W 12/12; H04M 1/72577
See application file for complete search history.

(56) References Cited

U.S. PATENT DOCUMENTS

2013/0078951 A1* 3/2013 Mun ...................... G06F 21/305
  455/411
2015/0012963 A1* 1/2015 Gupta .................. H04L 63/104
  726/1

FOREIGN PATENT DOCUMENTS

| CN | 102739868 A | 10/2012 |
|---|---|---|
| CN | 103458396 A | 12/2013 |
| CN | 103607697 A | 2/2014 |

* cited by examiner

*Primary Examiner* — Marcos Torres
(74) *Attorney, Agent, or Firm* — Hauptman Ham, LLP (57) ABSTRACT

Embodiments of the present invention disclose a method and an apparatus for controlling a communications terminal and a corresponding communications terminal, including: setting, in a communications terminal, authentication information of a subscriber identity module (SIM) change; monitoring a SIM change broadcast sent by the communications terminal, and setting, after the SIM change broadcast is monitored, the communications terminal to a locked state; and monitoring input information on the communications terminal, performing authentication and comparison, after the input information is monitored, on the input information and the set authentication information of a SIM change, and releasing, after the authentication succeeds, the locked state of the communications terminal. The embodiments of the present invention can improve security of information in a communications terminal.

11 Claims, 3 Drawing Sheets

(51) Int. Cl.
*H04M 1/725* (2006.01)
*H04W 8/22* (2009.01)
*H04W 12/06* (2009.01)

METHOD AND APPARATUS FOR CONTROLLING COMMUNICATIONS TERMINAL AND CORRESPONDING COMMUNICATIONS TERMINAL

CROSS REFERENCE TO RELATED APPLICATION

This application is a continuation of International Application No. PCT/CN2015/074867, filed on Mar. 23, 2015, which claims priority to Chinese patent application No. 201410110038.4, filed on Mar. 24, 2014, the content of which are incorporated herein by reference in their entirety.

FIELD OF THE TECHNOLOGY

This application relates to the field of technologies of communications terminals, and in particular, to a method and an apparatus for controlling a communications terminal and a corresponding communications terminal.

BACKGROUND OF THE DISCLOSURE

A terminal having a data processing capability, for example, a computer, a smart phone, a palmtop computer, a tablet computer, and a smart TV, have already been widely used in work and life nowadays. Especially, a portable intelligent terminal such as a smart phone, a personal digital assistant (PDA), a pocket personal computer (Pocket PC), and a tablet computer already becomes an indispensable tool that people take with themselves.

The terminal becomes a communications terminal after being installed with a communications module. For example, a mobile phone is a common communications terminal, and is a portable communications terminal. In addition to the communications module, a subscriber identity module (SIM) for identifying a subscriber also needs to be installed in the communications terminal. For example, a SIM card is an apparatus for identifying a communications terminal in a mobile communications system, and is also referred to as a smart card, or a user identification card. A mobile phone can be used only after a SIM card is installed. The SIM card stores, on a chip, content such as information of a subscriber of a digital mobile phone, an encrypted key, and a phone book of the user, which can be used to identify the subscriber of the mobile phone and perform processing such as encryption of voice information during a call of the subscriber.

Moreover, as the amount of information stored by the communications terminal increases, a subsequent issue of privacy protection also becomes increasingly important. Especially, a mobile phone is not only a communications tool, but also stores a lot of personal information. A grave risk of leakage of privacy information exists once the mobile phone is lost.

At present, events that mobile phones are lost or stolen often happen. In such a case, if a nonowner has a mobile phone of an owner and continues to use an original SIM card of the mobile phone, the owner may track the position of the mobile phone according to information in the SIM card. Therefore, a malicious nonowner often changes a SIM card of a mobile phone immediately after finding or stealing the mobile phone, and in this way, an owner of the mobile phone can no longer track the specific position of the mobile phone and regain the mobile phone. However, the nonowner may still view most of information in the mobile phone after turning on the mobile phone, which causes leakage of privacy information of the owner.

SUMMARY

In view of this, embodiments of the present invention provide a method and an apparatus for controlling a communications terminal and a corresponding communications terminal, so as to improve security of information in a communications terminal.

A method for controlling a communications terminal includes:

setting, in a communications terminal, authentication information of a SIM change;

monitoring a SIM change broadcast sent by the communications terminal, and setting, after the SIM change broadcast is monitored, the communications terminal to a locked state; and monitoring input information on the communications terminal, performing authentication and comparison, after the input information is monitored, on the input information and the set authentication information of a SIM change, and releasing, after the authentication succeeds, the locked state of the communications terminal.

An apparatus for controlling a communications terminal includes:

a setting module, configured to set, in a communications terminal, authentication information of a SIM change;

a locking module, configured to monitor a SIM change broadcast sent by the communications terminal, and set, after the SIM change broadcast is monitored, the communications terminal to a locked state; and an unlocking module, configured to monitor input information on the communications terminal, perform authentication and comparison, after the input information is monitored, on the input information and the set authentication information of a SIM change, and release, after the authentication succeeds, the locked state of the communications terminal.

A communications terminal includes the control apparatus as described above.

As described above, in the embodiments of the present invention, a SIM change broadcast sent by a communications terminal can be monitored. In a case in which a communications terminal is lost or stolen, if a nonowner has the mobile phone and changes a SIM of the communications terminal, an operating system of the communications terminal sends a SIM change broadcast, a screen of the communications terminal may be set to a locked state in time after the broadcast is monitored, and the locked state of the communications terminal can be released only after authentication information is input and authentication succeeds. Therefore, by means of the present disclosure, in a case in which a communications terminal is lost or stolen, privacy information in the communications terminal can be effectively protected, and security of information in the communications terminal can be improved.

DESCRIPTION OF EMBODIMENTS

In embodiments of the present invention, a communications terminal refers to a communications terminal having a function of data computing and processing, and includes, but is not limited to, a smart phone, a palmtop computer, a tablet computer, and a smart TV installed with a communications module. These intelligent terminals are all installed with an operating system, which includes, but is not limited to, an Android operating system, a Symbian operating system, a Windows mobile operating system, an Apple's iPhone OS operating system, and the like.

Specific types of some communications terminals and specific types of operating systems are listed above in detail, but a person skilled in the art may realize that implementation manners of the present disclosure are not limited to the types listed above and are also applicable to any other types of intelligent terminals and types of operating systems.

A communications module of the communications terminal described in the embodiments of the present invention includes a SIM for identifying a subscriber, for example, a SIM card in a mobile phone. In preferred embodiments below, the SIM may be a SIM card.

Figure 1:
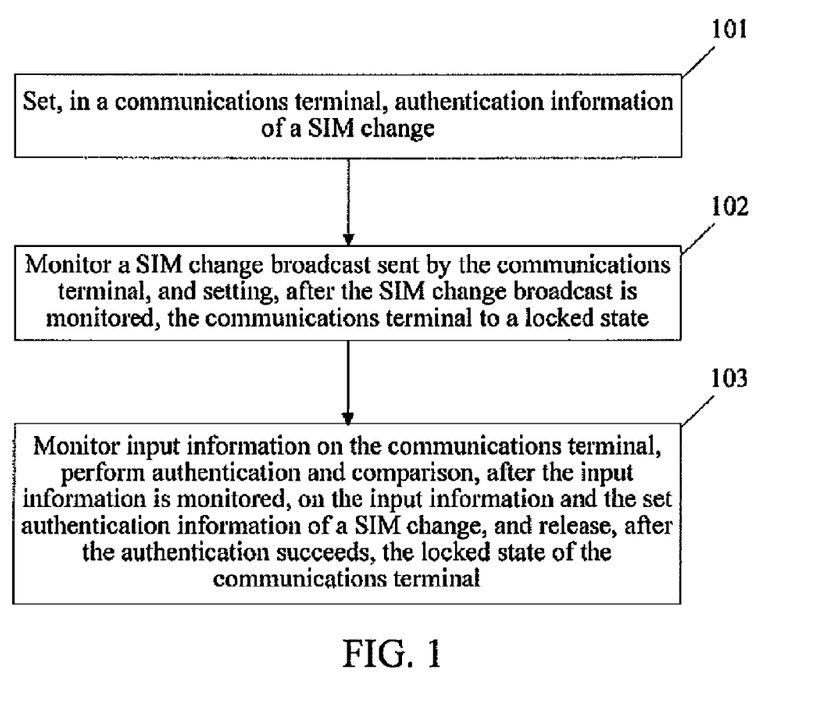
FIG. 1 is a flowchart of a method for controlling a communications terminal described in an embodiment of the present invention.

FIG. 1 is a flowchart of a method for controlling a communications terminal described in an embodiment of the present invention. Referring to FIG. 1, the method includes:

Step 101. Set, in a communications terminal, authentication information of a SIM change.

In this step, a setting interface for authentication of a SIM change may be presented at the communications terminal, to prompt, in the setting interface, a user to input a character string, that is, a password, and the input character string is stored as the authentication information of a SIM change. As described in subsequent steps, the password is specially used for performing authentication in a state of a SIM change.

In the present disclosure, the authentication information of a SIM change may also be, in addition to a character string, authentication information such as gesture input information, human face feature information, voice information, or fingerprint information in another embodiment. In these embodiments, the setting, in a communications terminal, authentication information of a SIM change specifically includes: starting an identification information capture module to capture identification information input on the communications terminal, using the identification information as an authentication sample, computing key information of the authentication sample, and storing the key information of the authentication sample as the authentication information of a SIM change.

For example, if the authentication information is gesture input information, the identification information capture module may include a gesture identification module connected to a touch screen of the communications terminal. The identification information capture module may first release prompt information for prompting a user to input gesture information, for example, a text prompt on the screen, or a sound prompt output by a loudspeaker. After the user inputs, on the touch screen, corresponding gesture information, the gesture identification module receives gesture input information (gesture operation information such as a sliding path or a handwriting stroke) sensed by the touch screen. The gesture input information is then used as an authentication sample. Key path information of the authentication sample is computed. For example, the key path information of the authentication sample may be obtained by analyzing a contour and a sequence of the authentication sample. The key path information of the authentication sample is stored as the authentication information of a SIM change.

For example, if the authentication information is human face feature information, the identification information capture module may include a human face identification module connected to a camera of the communications terminal. The identification information capture module may first release prompt information to prompt a user to put the face close to the camera. The camera is then turned on to photograph a facial photo of the user. The facial photo is used as an authentication sample. The human face identification module then analyzes and samples the photographed facial photo to obtain key data of the sample. The key data of the sample is stored as the authentication information of a SIM change.

If the authentication information is voice information or fingerprint information, similarly, voice information or fingerprint information of a user may also be correspondingly captured and analyzed and sampled to obtain key sample information. The key sample information is stored as the authentication information of a SIM change.

Step 102. Monitor a SIM change broadcast sent by the communications terminal, and set, after the SIM change broadcast is monitored, the communications terminal to a locked state.

In the embodiment of the present invention, the SIM change broadcast sent by the communications terminal may specifically include: a SIM replacement broadcast, or a SIM absence broadcast.

For the communications terminal described in the embodiment of the present invention, an existing operating system thereof can send a corresponding event broadcast. For example, the SIM replacement broadcast may be sent when a SIM card of the communications terminal is replaced. The communications terminal may be a communications terminal with an integrated battery, for example, a mobile phone with an integrated battery. For such a communications terminal, the battery cannot be disassembled, and a SIM card can be hot swapped in a case in which the communications terminal is not turned off. The swapping operation triggers an existing operating system of the communications terminal to send a SIM replacement broadcast. In another embodiment, the communications terminal may be a communications terminal with a detachable battery, for example, a mobile phone with a detachable battery. For such a communications terminal, when a SIM card is replaced, the communications terminal must be turned off to detach a power supply. After the communications terminal is turned on again, an existing operating system of the communications terminal automatically monitors a state of a SIM card, if a SIM card is not installed, releases a SIM absence broadcast, and if a SIM card is different from the originally recorded SIM card, releases a SIM replacement broadcast.

A broadcast released by the operating system of the communications terminal may be monitored by an application in the communications terminal, and a type of the broadcast may be identified by parsing a type parameter of the broadcast. For example, after monitoring the broadcast from the operating system of the communications terminal, in the present disclosure, it may be determined by parsing the type parameter of the broadcast whether the broadcast is the SIM change broadcast, and if yes, the communications terminal is set to a locked state, or if not, the broadcast is discarded.

In the embodiment of the present invention, the setting the communications terminal to a locked state is to set, in a general embodiment, the communications terminal to a lock screen state. In this state, a user cannot enter a user interface of the communications terminal and cannot perform a normal operation on the communications terminal, thereby preventing the user from acquiring privacy information inside the communications terminal.

In a preferred embodiment of the present invention, the lock screen is a global window of the operating system of the communications terminal, and the global window may be implemented by using a corresponding application programming interface (API) provided by the operating system. The global window may be set on the top layer of a screen to cover other windows on the screen, and also does not respond to a cancellation instruction (for example, a return instruction of a HOME button) of other buttons of the communications terminal and blocks other operation instructions, so that the user cannot operate the communications terminal, thereby achieving an objective of locking the communications terminal. In the global window, the user may be prompted to input subsequent authentication information, and the authentication information input by the user is authenticated by means of an authentication operation in a subsequent step. The global window is cancelled only after the authentication succeeds, and the user can normally operate the communications terminal, thereby achieving an objective of unlocking the communications terminal.

In some special cases, the operating system of the communications terminal may send some incorrect broadcasts, for example, sends a SIM change broadcast too in a case in which a SIM card is not absent or replaced, but in this case, a content parameter in the SIM change broadcast is null. Therefore, in a preferred embodiment of the present invention, to prevent interference from an incorrect broadcast, before the setting, after the SIM change broadcast is monitored, the communications terminal to a locked state, step 102 further includes: determining a content parameter of the SIM change broadcast, and if the content parameter is null, determining that an incorrect SIM change broadcast is monitored, and returning to step 102 to continue to monitor a SIM change broadcast sent by the communications terminal instead of performing a subsequent step.

Step 103. Monitor input information on the communications terminal, perform authentication and comparison, after the input information is monitored, on the input information and the set authentication information of a SIM change, and release, after the authentication succeeds, the locked state of the communications terminal.

In the previous step, after the communications terminal is set to the locked state, a user may be further prompted to input authentication information, for example, a text prompt on the screen or a sound prompt output by a loudspeaker.

If the authentication information of a SIM change set in step 101 above is character string information, in step 103, a character string input by the user is monitored. After it is monitored that the user inputs a character string, similarity comparison is performed between the monitored character string and the stored authentication information of a SIM change, and in a case in which the monitored character string is identical with the stored authentication information of a SIM change, it is determined that the authentication succeeds.

If the authentication information of a SIM change set in step 101 above is authentication information such as gesture input information, human face feature information, voice information, or fingerprint information, in step 103, an identification information capture module is also started to capture identification information input on the communications terminal, key information of the identification information is computed, similarity comparison is performed between the key information obtained through computation and the stored authentication information of a SIM change, and in a case in which similarity between the key information and the stored authentication information of a SIM change is higher than a corresponding threshold, it is determined that the authentication succeeds.

For example, if the authentication information of a SIM change set in step 101 above is gesture input information, the identification information capture module may include a gesture identification module connected to a touch screen of the communications terminal. In step 103, prompt information for prompting the user to input gesture information, for example, a text prompt on the screen, or a sound prompt output by a loudspeaker, is released first. After the user inputs, on the touch screen, corresponding gesture information, the gesture identification module receives gesture input information (gesture operation information such as a sliding path or a handwriting stroke) sensed by the touch screen. The gesture input information is then used as an authentication sample. Key path information of the authentication sample is computed. For example, the key path information of the authentication sample may be obtained by analyzing a contour and a sequence of the authentication sample. Similarity comparison is performed between the key path information of the authentication sample and the stored authentication information of a SIM change. In a case in which similarity is higher than a corresponding threshold, it is determined that the authentication succeeds, or otherwise, it is determined that the authentication fails.

Further, for example, if the authentication information of a SIM change set in step 101 above is human face feature information, the identification information capture module may include a human face identification module connected to a camera of the communications terminal. In step 103, prompt information is released to prompt the user to put the face close to the camera. The camera is then turned on to photograph a facial photo of the user. The facial photo is used as an authentication sample. The human face identification module then analyzes and samples the photographed facial photo to obtain key data of the sample, and performs similarity comparison between the key data of the sample and the stored authentication information of a SIM change. In a case in which similarity is higher than a corresponding threshold, it is determined that the authentication succeeds, or otherwise, it is determined that the authentication fails.

If the authentication information is voice information or fingerprint information, similarly, voice information or fingerprint information of a user may also be correspondingly captured and analyzed and sampled to obtain key sample information. Similarity comparison is performed between the key sample information and the stored authentication information of a SIM change. In a case in which similarity is higher than a corresponding threshold, it is determined that the authentication succeeds, or otherwise, it is determined that the authentication fails.

In a further embodiment of the present invention, after the authentication in step 103 succeeds, the method may further include that: displaying a list of options, receiving a selection instruction for the options, determining whether a selected option is the same as a preset correct option, and if same, releasing the locked state of the communications terminal, or otherwise, keeping the locked state of the communications terminal.

For example, in this method, music ringtone names, application names, or desktop icons of the operating system of this communications terminal may be acquired as option materials, and these option materials are added to a temporary resource library. When the authentication information of a SIM change is set in step 101, option materials are read from the temporary resource library and output and displayed in a candidate list. The user selects at least one as a correct option, and the correct option is stored. After the authentication in step 103 succeeds, the correct option set by the user is output into a current interface, other material options are randomly selected from the temporary resource library and are also output into the current interface, and these options constitute a list of options. If the user selects the correct option, the locked state of the communications terminal is released, or otherwise, the locked state of communications terminal is still kept.

As described above, in the foregoing embodiment, a selection dimension for unlocking and authentication is further added, so as to further increase the cracking difficulty to achieve unlocking, improve security of a lock screen state of a communications terminal, and more effectively protect security of data inside the communications terminal.

The method of the embodiment of the present invention may further include that: counting, if the authentication fails, the number of times that the authentication fails, and deleting, if a specified number of times that the authentication fails is exceeded, specified information on the communications terminal. The specified information may be set in a corresponding setting interface in advance. For example, a deletion operation such as deletion of an address book, uninstallation of an application, or even formatting of a memory card, may be set.

Figure 2:
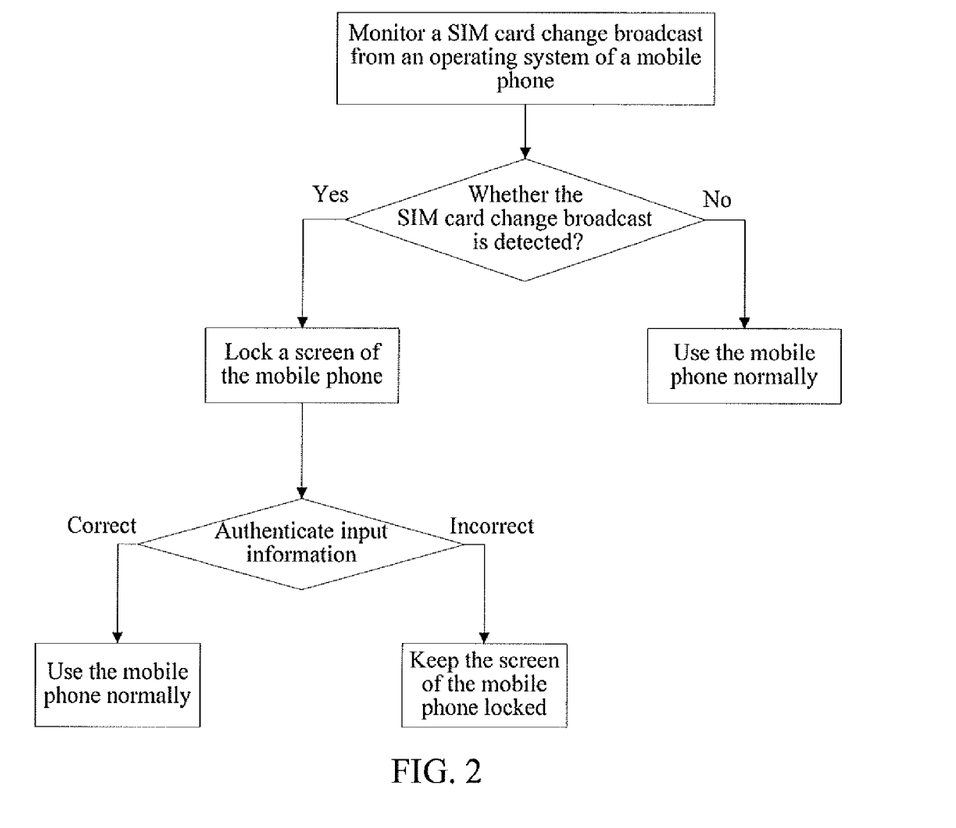
FIG. 2 is a specific flowchart when a method for controlling a communications terminal described in an embodiment of the present invention is applied to a mobile phone.

The foregoing method is further described below by using an example in which the communications terminal is a mobile phone, and the SIM is a SIM card. FIG. 2 is a specific flowchart when a method for controlling a communications terminal described in an embodiment of the present invention is applied to a mobile phone. In the method, authentication information corresponding to a SIM card change, for example, a character string password, may be set on the mobile phone in advance. Referring to FIG. 2, in the present invention, a SIM card change broadcast sent by an operating system of the mobile phone may be monitored. If a SIM card change broadcast is monitored, a screen of the mobile phone is locked. If a SIM card change broadcast is not monitored, the mobile phone can be normally used. After the screen of the mobile phone is locked, information input by a user, that is, a character string password, is further authenticated. If the password input by the user is the same as a set password, authentication is correct, the mobile phone is unlocked, and the mobile phone can be normally used. If the password input by the user is incorrect, authentication is incorrect, and the screen of the mobile phone is still kept locked. In this way, even if a SIM card is replaced after a mobile phone of a user is stolen, a user may further be required to input a password, and the mobile phone can only be normally used after a correct password is input, thereby protecting information in the mobile phone of the user, and improving security of the information.

Figure 3:
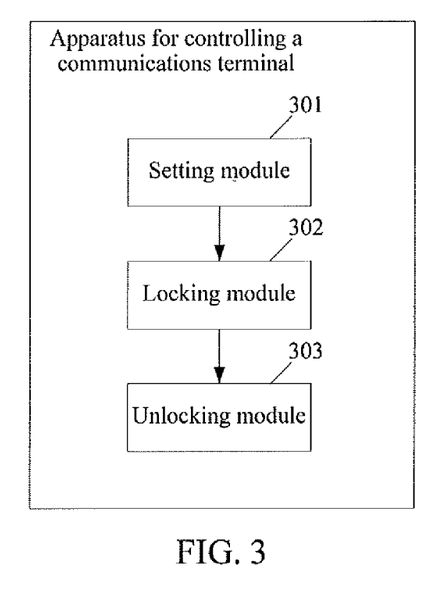
FIG. 3 is a schematic diagram of an apparatus for controlling a communications terminal described in an embodiment of the present invention.

Corresponding to the foregoing method of the present disclosure, the present disclosure further discloses an apparatus for controlling a communications terminal. FIG. 3 is a schematic diagram of an apparatus for controlling a communications terminal described in an embodiment of the present invention. Referring to FIG. 3, the apparatus includes:

a setting module 301, configured to set, in a communications terminal, authentication information of a SIM change;

a locking module 302, configured to monitor a SIM change broadcast sent by the communications terminal, and set, after the SIM change broadcast is monitored, the communications terminal to a locked state; and an unlocking module 303, configured to monitor input information on the communications terminal, perform authentication and comparison, after the input information is monitored, on the input information and the set authentication information of a SIM change, and release, after the authentication succeeds, the locked state of the communications terminal.

In a preferred embodiment of the control apparatus, the locking module 302 is further configured to determine, after the SIM change broadcast is monitored, a content parameter of the SIM change broadcast, determine, if the content parameter is null, that an incorrect SIM change broadcast is monitored, and continue to monitor a SIM change broadcast sent by the communications terminal without setting the communications terminal to the locked state. In this way, interference from an incorrect broadcast can be prevented.

In another preferred embodiment of the control apparatus, the setting module 301 is specifically configured to: present a setting interface for authentication of a SIM change, prompt a user to input a character string, and store the input character string as the authentication information of a SIM change; and the unlocking module 303 is specifically configured to: monitor a character string input by the user, perform, after it is monitored that the user inputs a character string, similarity comparison between the monitored character string and the stored authentication information of a SIM change, and determine, in a case in which the monitored character string is identical with the stored authentication information of a SIM change, that the authentication succeeds, and release the locked state of the communications terminal; or otherwise, determine that the authentication fails, and keep the locked state of the communications terminal.

Figure 4:
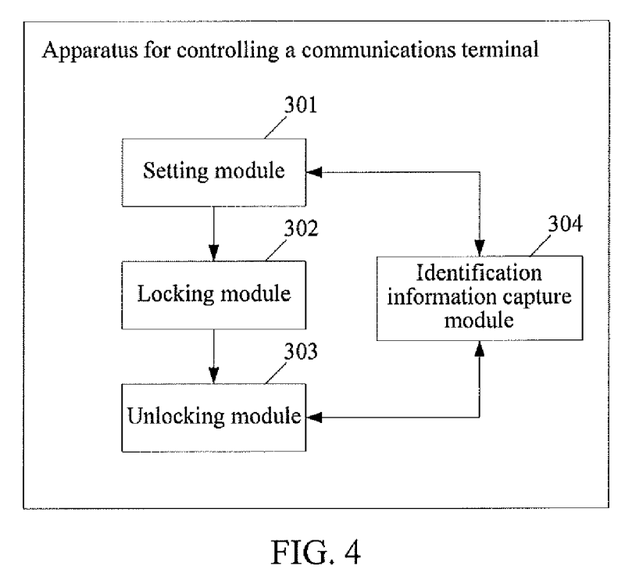
FIG. 4 is another schematic diagram of an apparatus for controlling a communications terminal described in an embodiment of the present invention.

In still another preferred embodiment of the control apparatus, as shown in FIG. 4, the apparatus further includes: an identification information capture module 304; the setting module 301 is specifically configured to: start the identification information capture module 304 to capture identification information input on the communications terminal, use the identification information as an authentication sample, compute key information of the authentication sample, and store the key information of the authentication sample as the authentication information of a SIM change; and the unlocking module 303 is specifically configured to: start the identification information capture module 304 to capture identification information input on the communications terminal, compute key information of the authentication information, perform similarity comparison between the key information obtained through computation and the stored authentication information of a SIM change, and determine, in a case in which similarity between the key information and the stored authentication information of a SIM change is higher than a corresponding threshold, that the authentication succeeds, and release the locked state of the communications terminal; or otherwise, determine that the authentication fails, and keep the locked state of the communications terminal.

In a further preferred embodiment, the identification information capture module 304 may be: a module configured to capture gesture input information, a module configured to capture human face feature information, a module configured to capture voice information, or a module configured to capture fingerprint information. Certainly, the identification information capture module 304 may also be a module configured to capture other identification information.

In a preferred embodiment of the control apparatus, the setting module 301 is further configured to set a correct option; and the unlocking module 303 is further configured to display, after the authentication succeeds, a list of options, receive a selection instruction for the options, determine whether a selected option is the same as a preset correct option, and release, if same, the locked state of the communications terminal, or otherwise, keep the locked state of the communications terminal.

Further, the present disclosure further discloses a communications terminal, which includes any embodiment of the foregoing apparatus for controlling a communications terminal.

In addition, the functional modules in the embodiments of the present invention may be integrated into one processing unit, or each of the modules may exist alone physically, or two or more modules may be integrated into one unit. The integrated unit may be implemented in the form of hardware, or may be implemented in the form of a software functional unit. The functional modules in the embodiments may be located in one terminal or network node, or may be distributed on multiple terminals or network nodes.

In addition, each embodiment of the present invention may be implemented by a data processing program that is executed by a data processing device such as a computer. Apparently, the data processing program constitutes the present disclosure. In addition, generally a data processing program stored in a storage medium is executed by directly reading the program from the storage medium or by installing or copying the program to a storage device (such as a hard disk or memory) of a data processing device. Therefore, such a storage medium also constitutes the present disclosure. The storage medium may use any type of recording, for example, a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further discloses a storage medium, having a data processing program stored therein, the data processing program being used to perform any one of the embodiments of the method in the present disclosure.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for controlling a communications terminal, comprising:
    setting, in a communications terminal, authentication information of a subscriber identity module (SIM) change;
    monitoring a SIM change broadcast sent by the communications terminal, and setting, after the SIM change broadcast is monitored, the communications terminal to a locked state; and
    monitoring input information on the communications terminal, performing first authentication and comparison, by the communications terminal, after the input information is monitored, on the input information and the set authentication information of a SIM change, and performing second authentication after the first authentication succeeds,
    wherein the second authentication comprises:
    displaying a list of options, receiving a selection instruction for the options, determining whether a selected option is the same as a preset correct option, and releasing by the communications terminal, if same, the locked state of the communications terminal, or otherwise, keeping the locked state of the communications terminal;
    wherein the method further comprises:
    determining, after the SIM change broadcast is monitored and before the communications terminal is set to the locked state, a content parameter of the SIM change broadcast,
    when the content parameter is null, an incorrect SIM change broadcast is monitored, and the locking module is configured to continue to monitor a SIM change broadcast sent by the communications terminal without setting the communications terminal to the locked state,
    when the content parameter is not null, a correct SIM change broadcast is monitored, and the locking module is configured to set the communications terminal to the locked state.

2. The method according to claim 1, wherein
    the setting, in a communications terminal, authentication information of a SIM change specifically comprises: presenting a setting interface for authentication of a SIM change, prompting a user to input a character string, and storing the input character string as the authentication information of a SIM change; and
    the monitoring input information on the communications terminal, and performing first authentication and comparison, after the input information is monitored, on the input information and the set authentication information of a SIM change, specifically comprises: monitoring a character string input by the user, performing, after it is monitored that the user inputs a character string, similarity comparison between the monitored character string and the stored authentication information of a SIM change, and determining, in a case in which the monitored character string is identical with the stored authentication information of a SIM change, that the first authentication succeeds.

3. The method according to claim 1, wherein
    the setting, in a communications terminal, authentication information of a SIM change specifically comprises: starting an identification information capture module to capture identification information input on the communications terminal, using the identification information as an authentication sample, computing key information of the authentication sample, and storing the key information of the authentication sample as the authentication information of a SIM change; and
    the monitoring input information on the communications terminal, and performing first authentication and comparison, after the input information is monitored, on the input information and the set authentication information of a SIM change, specifically comprises: starting the identification information capture module to capture identification information input on the communications terminal, computing key information of the authentication information, performing similarity comparison between the key information obtained through computation and the stored authentication information of a SIM change, and determining, in a case in which similarity between the key information and the stored authentication information of a SIM change is higher than a corresponding threshold, that the first authentication succeeds.

4. The method according to claim 3, wherein the identification information is: gesture input information, human face feature information, voice information, or fingerprint information.

5. The method according to claim 1, wherein the SIM change broadcast comprises: a SIM replacement broadcast, or a SIM absence broadcast.

6. The method according to claim 1, wherein the SIM is a SIM card.

7. An apparatus for controlling a communications terminal, comprising:
a setting module, configured to set, in a communications terminal, authentication information of a subscriber identity module (SIM) change;
a locking module, configured to monitor a SIM change broadcast sent by the communications terminal, and set, after the SIM change broadcast is monitored, the communications terminal to a locked state; and
an unlocking module, configured to monitor input information on the communications terminal, perform first authentication and comparison, after the input information is monitored, on the input information and the set authentication information of a SIM change, and perform second authentication after the first authentication succeeds,
wherein the setting module is further configured to set a correct option;
wherein the second authentication comprises:
displaying a list of options, receiving a selection instruction for the options, determining whether a selected option is the same as a preset correct option, and releasing, if same, the locked state of the communications terminal or otherwise, keeping the locked state of the communications terminal:
wherein the locking module is further configured to determine, after the SIM change broadcast is monitored and before the communications terminal is set to the locked state, a content parameter of the SIM change broadcast,
when the content parameter is null, an incorrect SIM change broadcast is monitored, and the locking module is configured to continue to monitor a SIM change broadcast sent by the communications terminal without setting the communications terminal to the locked state,
when the content parameter is not null, a correct SIM change broadcast is monitored, and the locking module is configured to set the communications terminal to the locked state.

8. The apparatus according to claim 7, wherein
the setting module is specifically configured to: present a setting interface for authentication of a SIM change, prompt a user to input a character string, and store the input character string as the authentication information of a SIM change; and
the unlocking module is specifically configured to: monitor a character string input by the user, perform, after it is monitored that the user inputs a character string, similarity comparison between the monitored character string and the stored authentication information of a SIM change, and determine, in a case in which the monitored character string is identical with the stored authentication information of a SIM change, that the first authentication succeeds.

9. The apparatus according to claim 7, wherein the apparatus further comprises an identification information capture module,
the setting module is specifically configured to: start the identification information capture module to capture identification information input on the communications terminal, use the identification information as an authentication sample, compute key information of the authentication sample, and store the key information of the authentication sample as the authentication information of a SIM change; and
the unlocking module is specifically configured to: start the identification information capture module to capture identification information input on the communications terminal, compute key information of the authentication information, perform similarity comparison between the key information obtained through computation and the stored authentication information of a SIM change, and determine, in a case in which similarity between the key information and the stored authentication information of a SIM change is higher than a corresponding threshold, that the first authentication succeeds.

10. The apparatus according to claim 9, wherein the identification information capture module is: a module configured to capture gesture input information, a module configured to capture human face feature information, a module configured to capture voice information, or a module configured to capture fingerprint information.

11. A communications terminal, comprising the control apparatus according to claim 7.

* * * * *